United States Patent Office 3,093,447
Patented June 11, 1963

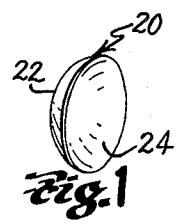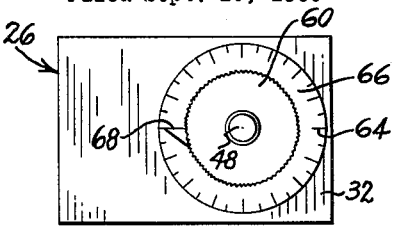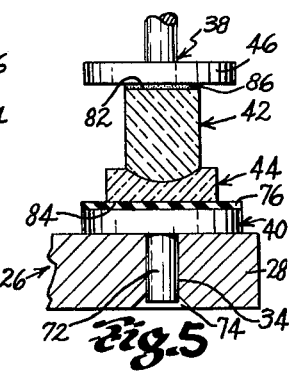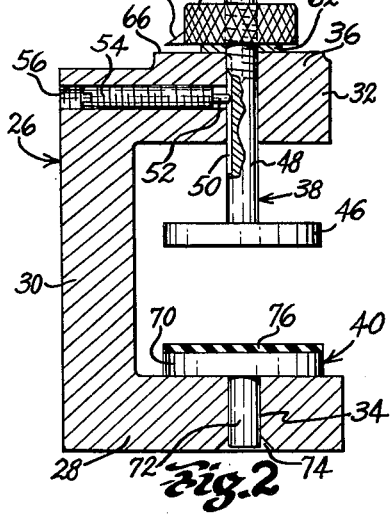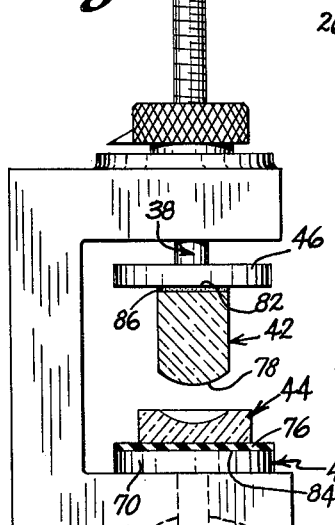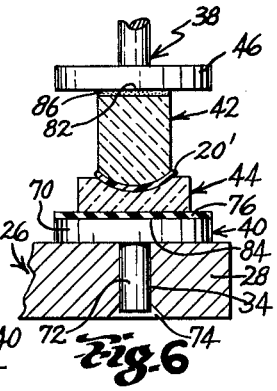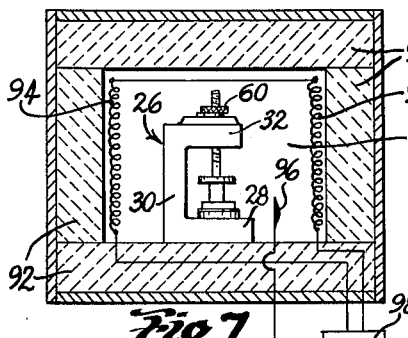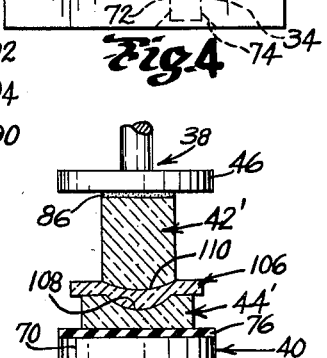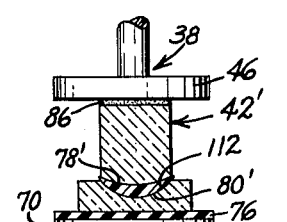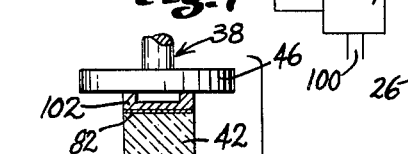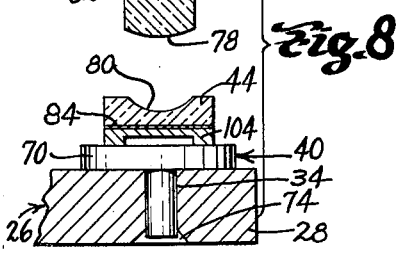
INVENTOR
HARRY D. CRANDON
BY
ATTORNEY

3,093,447
METHOD OF CASTING OPTICAL ELEMENTS
Harry D. Crandon, Woodstock, Conn., assignor to American Optical Company, Southbridge, Mass., a voluntary association of Massachusetts
Filed Sept. 15, 1960, Ser. No. 56,136
5 Claims. (Cl. 18—58)

This invention relates to improvements in method and apparatus for casting resinous optical lens elements and has particular reference to novel precision method for making contact lenses or like articles.

In the manufacture of optical elements such as contact lenses, particularly of the corneal type which are worn directly upon the eyes, the lens curvatures, diameters, zonal widths and surface finish, among other things, must be consistently relied upon in order to permit contact lens fitting to become less of an art and more of a science. That is, for best practices, the uniqueness of a patient's requirements must be dealt with without variability in lenses.

In instances where replacement of a lost lens or pair thereof is required, the need for standardization and minimum tolerances of production lenses is of utmost importance since, with wearing, an intimate relationship between the cornea and the lens posterior side usually results from the cornea tending to assume the lens shape. Thus, it can be seen that to replace lenses with others having a posterior surface curvature of anything but substantially the same geometrical shape as that of the originally fitted lenses would tend to cause physical and visual discomfort to the recipient particularly during the interim required for the cornea to readjust to the newly fitted lens shape.

Furthermore, by precise standardization and substantially non-variable control of the geometrical characteristics and surface finishes of lenses of the above type, better fitting techniques can be had and corneal irritation or damage can be minimized or eliminated.

A precise duplicating process is, therefore, essential to the achievement of standardization of the characteristics of production-made contact lenses and since casting is inherently a duplicating process, the present invention relates more particularly to a novel and improved casting technique for making articles of the above character.

It is pointed out that the more common practices of turning and/or cutting contact lenses to shape from rod or sheet stock lead to considerable difficulty in duplication of surface quality, curve shapes and other dimensional factors.

In view of the above, it is a principal object of this invention to provide an improved quality controlled method of high reliability of duplication for making superior optical lens elements and apparatus for accomplishing the same.

Another object is to provide an improved technique for casting resinous materials into lens shapes having relatively thin cross-sections with surface finishes of high optical quality and precisely controlled dimensional characteristics.

Another object is to provide casting apparatus embodying individually supported readily detachable mold members each having a curved effective casting surface and novel method for accomplishing a precise desired cooperative alignment of said effective casting surfaces of said mold members when supported on said apparatus.

Another object is to provide novel method for adapting said mold members to individual supporting parts of said apparatus to permit an initial lateral adjustment of at least one of said members without detachment thereof from its respective supporting part for purposes of initially aligning said mold members, one relative to another.

Another object is to provide for the achievement of said above-mentioned axial alignment of said effective casting surfaces of said mold members automatically and simply by interfitting said surfaces, one within the other or alternatively into spacer means therebetween having coaxial surface configurations matching those of the respective casting surfaces of said members while at least one of said members is initially adjustably attached to its respective supporting part of said apparatus.

Another object is to provide, in combination with the above, mold members formed of materials which lend themselves readily to being highly accurately optically finished to provide casting surfaces thereon of exceptional optical perfection for purposes of duplication upon articles cast thereby.

A further object is to provide method for casting optical lens elements which is unique in its simplicity, economy in operation, reliability as to precision in duplication and versatility particularly in the field of contact lens manufacture.

Other objects and advantages of the invention will become apparent from the following description when taken in conjunction with the accompanying drawings in which:

FIG. 1 is an enlarged perspective view of one form of a lens element which is made in accordance with this invention;

FIG. 2 is an enlarged partially cross-sectioned view of a preferred form of apparatus for carrying out the method of the invention;

FIG. 3 is a top plan view of the apparatus shown in FIG. 2;

FIG. 4 is a side elevational view of the apparatus shown in FIGS. 2 and 3 illustrated with separable mold members applied thereto;

FIG. 5 is a fragmentary view of the apparatus shown in FIG. 4 and illustrates, when taken together with FIG. 4, a technique for accomplishing a desired alignment of the separable mold members;

FIG. 6 is a fragmentary view generally similar to FIG. 5 illustrating the casting of an optical element between said mold members.

FIG. 7 is a diagrammatic illustration of heating means for carrying out a subsequent step in the method of the invention;

FIG. 8 is a fragmentary view similar to FIGS. 5 and 6 but illustrating a modification of the apparatus; and FIGS. 9 and 10 are fragmentary partially cross-sectioned views similar to FIGS. 5 and 6, but illustrating modified method steps of the invention and means for accomplishing the same.

Referring more particularly to the drawings wherein like characters of reference designate like parts throughout the several views thereof, it will be seen that FIG. 1 is an enlarged view of a corneal contact lens 20 having a convexly curved anterior surface 22 and a concavely curved posterior surface 24.

In practice, the posterior surface 24 is shaped in accordance with the particular corneal curvature with which it is to be used and is usually referred to as the base or corneal curvature of the lens. This surface 24 may be either a multicurve or bicurve construction or single spherical curve or of any other shape in accordance with the different practices used in the fitting of lenses of this type.

The anterior surface 22 of a finished corneal contact lens is usually provided with a curvature or shape which is calculated in accordance with the refractive findings and base curve to provide the user with his required visual correction.

Various fitting techniques require different base-side constructions, some of which are subsequently modified by the practitioner in accordance with his practice in fitting. In this respect, some lenses are supplied to practitioners with single spherical base curves varying, for example in ¼ diopter steps throughout the required normal fitting range and with substantially parallel opposite side surfaces upon which the refractive findings are subsequently applied by the practitioner in accordance with the particular base curve of the lens selected for use. The base-side may also be modified by the practitioner wherein he might provide a peripheral zone curvature of a controlled width which differs from the base curve for more accurate fitting throughout the paraapical corneal region. Such a bicurve base-side construction may, alternatively, be provided to the practitioner with a fixed known peripheral zone curvature and width wherein the practitioner, in selecting such a lens, might thereafter alter the immediate portion of the base-side construction to fit the particular apical corneal region of a patient.

A multicurve monaxial base-side construction has also found favor in the fitting of corneal contact lenses wherein a better approximation of the corneal contour is desired.

In any event, the lenses are cast, in accordance with this invention, to any shape desired in the profession and with fixed dependable duplication of surface configuration and finish regardless of the particular base-side construction desired. It is also pointed out that while some of the above-mentioned fitting practices require that the practitioner finish certain zones or areas of the base side of the lenses as well as the opposite side thereof, it will become apparent hereinafter that the lenses 20 of this invention may be cast directly, without requiring subsequent finishing, to the precise curvatures required for fitting the posterior or base side thereof whether or not said base side is to be a bicurve or multicurve construction, spherical, toroidal or any other surface configuration. Furthermore, if desired, lenses such as 20, can be cast, in accordance with this invention, directly to the prescriptive, as well as fitting, requirements of a prospective user by simultaneously forming both the posterior and anterior curvatures 24 and 22 to the required shapes and optical finishes.

Referring more particularly to FIGS. 2 and 3, it will be seen that there is provided a casting device 26 having a rigid C-shaped main body part 26 embodying a base section 28, an upright intermediate section 30 and an upper section 32 in overhanging relation with the base section 28. The base and upper sections 28 and 32 are provided with coaxial bores 34 and 36 respectively in which upper and lower holding members, generally indicated as 38 and 40 respectively, are intimately slidably fitted. The holding members 38 and 40 are provided to support upper and lower mold halves 42 and 44 (see FIG. 4) to be subsequently described in detail and between which the lens 20 is cast.

The holding member 38 embodies a platen 46 integrally formed upon the depending end of a rod-like part 48 which extends through the bore 36 and is intimately slidably fitted therein.

The rod-like part 48 is provided with a keyway 50 into which the reduced end portion 52 of a locating screw 54 is normally fitted as shown in FIG. 2 to prevent rotation of the holding member 38 while, at the same time, permitting free axial movement thereof in the bore 36. The screw 54 is threaded through a horizontal opening 56 in the body part 26 which communicates with the bore 36 so as to be readily insertable or withdrawable from the keyway 50 for purposes of assembling or disassembling the various associated parts of the device 26. The uppermost section of the rod-like part 48 is provided with threads 58 and a knurled thumb nut 60 which, in resting against a relatively loose fitting washer 62, supports the holding member in the overhanging section 32 of the device 26. Thus, it can be seen that rotation of the thumb nut will raise or lower the platen 46 in accordance with the direction of relative threading between the nut 60 and rod-like part 48. The respective interfitting threads on the nut 60 and rod-like part 48 are of a precontrolled pitch such as to cause the platen to lift or become lowered, as the case may be, a predetermined distance for each 360° revolution of the nut 60 and thereby provide a micrometer-like adjustment for the platen 46. In order to indicate the extent of raising or lowering of the platen 46, fixed indicating marks 64 (see FIG. 3) are provided on the upper slightly raised portion 66 of the top of the device 26 and a pointer 68 is provided on the nut 60. As mentioned above, the platen 46 while being vertically adjustable, is held against rotational movement by the screw 54.

On the base section 28 of the device 26, the lower holding member 40 embodies a mold supporting platen 70 having an integrally formed depending rod part 72 which is intimately yet slidably fitted into the bore 34 and when in a position of use on the device 26, the upwardly directed surface of the platen 70 is parallel to the adjacent face of the platen 46. Also, both of said faces are disposed normal to the axes of the bores 34 and 36. At the underside of the base section 28 of the device 26, the bore 34 is countersunk at 74 which provides finger room to permit the holding member to be easily removed from the device 26 by pressing its rod part 72 upwardly with a finger or suitable tool.

Upon the upper surface of the platen 70, there is provided a thin holding pad 76 for the lower mold half 44 (see FIGS. 2 and 4) which is preferably formed of a gum rubber composition or some similar pressure sensitive adhesive material which, when in use, will cling firmly to the platen 70 and mold half 44 to provide skid proof and secure means by which the lower mold half 44 may be subsequently attached to the platen 70.

While the mold halves 42 and 44 may be formed of stainless steel or other similar hard and stain-proof metallic material which can be provided with high quality optical finishes, they are preferably formed of a durable homogenous glass such as optical crown glass or the like which can be readily provided with casting surfaces of high optical perfection.

In this respect, the mold half 42 is provided with a casting surface 78 (see FIGS. 4–6) which is optically accurately finished by known standard methods of grinding and polishing to the curvature desired of the posterior side 24 of the lens 20 and the mold half 44 is likewise provided with an optically finished casting surface 80 accurately formed to the desired shape and curvature of the anterior side 22 of the lens 20. It is pointed out, however, that if a semifinished surface only is desired upon the side 22 of the lens 20 along with an optically finished side 24, the casing surface 80 need not be of optical perfection as to finihs. Likewise, if for any reason, only the side 22 of the lens 20 were to be optically finished by casting, only the casting surface 80 would need to be finished to optical perfection. In any event, however, it is preferable to cast lenses 20 having optically finished surfaces on both sides whether or not one or more sides or portions thereof are to be later finished to different shapes. In so doing, a more precise and easier inspection of the finally cast lenses 20 can be accomplished.

On the mold halves 42 and 44, the respective end portions 82 and 84 thereof which are opposite to the casting surfaces 78 and 80 are each accurately finished to a flat which is disposed at substantially right angles to the axes of curvatures of the said casting surfaces 78 and 80.

As mentioned above, the casting surfaces 78 and 80 may be formed to various types of curvatures in accordance with those desired of the respective surfaces on the sides 24 and 22 of the resultant lens 20. That is, one or the other or both of the casting surfaces 78 and 80 of the mold halves 42 and 44 might be of a bicurve construction, of a monoaxial multicurve, or toroidal or both surfaces may be case spherical with substantially identical surface curvatures or with one surface being somewhat flatter than the other, that is, with the casting surface 78 having a slightly longer radius of curvature than the casting surface 80. This latter type will be discussed with relation to FIGS. 4–6 wherein the procedure for casting a lens 20' (see FIG. 6) is as follows:

The casting molds 42 and 44 having spherical casting surfaces 78 and 80 are mounted upon their respective holding members 38 and 40. To accomplish this, the lower mold half 44 is pressed against the holding pad 76 with its axis preferably approximately coaxial with the axis of the bore 34. This coaxial alignment is not essential, however, as it will become apparent that with the lower mold half seated at practically any position on the pad 84, a subsequent precise coaxial alignment of the two mold halves 42 and 44 can be accomplished.

With the lower mold half secured in place by the pressure sensitive holding pad 76, or other adhesive, the surface 82 of the mold half 42 is provided with a thin coating of a relatively slow setting glass to metal adhesive 86 (see FIG. 4) such as shellac or a silicone resin or the like which is characterized in that, before becoming set, it will adhere readily to the adjoining surfaces and at the same time permit the mold half 42 to be easily adjusted laterally by sliding along the adjacent surface of the platen 46 without becoming disconnected therefrom.

With the mold half 42 adjustably attached to the platen 46 by means of the adhesive 86, a precise coaxial alignment of the casting surfaces 78 and 80 is accomplished by lowering the holding member 38 to the point where the casting surface 78 engages the casting surface 80. In continuing the lowering of the holding member 38, the mold half 42 will automatically adjust to a coaxial relationship with the fixed lower mold half 44 by sliding laterally along the platen 46 as the surfaces 78 and 80 become interfitted with each other. The adhesive 86 at this stage is such as to properly retain the mold half 42 on the platen 46.

When the mold halves 42 and 44 are accurately interfitted and secured as shown in FIG. 5, the holding member 38 is raised to lift the mold half 42 away from the mold half 44 a predetermined distance as shown in FIG. 6 in accordance with the ultimate center thickness desired of the lens 20'. The raising of the mold half 42 is accomplished by rotation of the thumb nut 60 and, by registration of the pointer 68 with a preselected one of the indicating marks 64, the proper spacing of the casting surfaces 78 and 80 is accomplished.

With the mold halves 42 and 44 precisely aligned with each other and spaced as just described, an initially fluid resinous material is flowed or otherwise inserted between the casting surfaces 78 and 80 to form the lens 20' as shown in FIG. 6.

The resinous material may be any suitable thermosetting, thermoplastic or other artificial resinous substance which can be polymerized to result in the formation of a relatively hard transparent plastic such as polycyclohexyl methacrylate, polystyrene or polymethyl methacrylate or the like.

In the usual manner of casting, the application of controlled heat to the casting material for a time cycle controlled in accordance with the nature of the material used will cause polymerization thereof wherein the opposed surfaces of the resultant lens 20' will take on the shape and finish of the casting surfaces 78 and 80 and be highly optically finished in accordance with the quality of optical finish initially provided on said surfaces 78 and 80.

In FIG. 7, there is shown diagrammatically a furnace 88 in which the entire device 26 is placed, after the insertion of the casting material between the mold halves, for purposes of bringing about polymerization of the said casting material. The furnace 88 embodies a heating chamber 90 formed by an enclosure constructed of refractory or other heat-insulating wall parts 92. Within the chamber 90 there is provided suitable electrical heating coils 94 or the like operably connected to a heat control arrangement embodying a thermocouple 96 also placed within the chamber 90 and electrically connected to a suitable electrical control device 98 (shown by block diagram) which is, in turn, connected to a source of operating current 100.

After being polymerized in the furnace 88, the lens 20' is cooled and removed from between the mold halves 42 and 44 by raising the holding member 38 with the thumb nut 60 to separate the mold halves.

The setting of the adhesive 86 fixes the coaxial relationship between the mold halves 42 and 44 whereby precise duplication of the lens 20' will thereafter be assured without realignment of the mold halves.

The above casting process may be repeated after removal of the lens 20' by again lowering the holder 38 with the thumb screw 60 to the previously mentioned level for casting, an indication of which is provided by the pointer 68 and indicating marks 64.

A modification of the invention is shown in FIG. 8 wherein permanent magnets 102 and 104 rigidly secured by cement or the like to the ends 82 and 84 of the mold halves 42 and 44 may be used to replace the above-described adhesive 86 and pressure sensitive pad 76.

In such a case, the platens 46 and 70 of the respective holding members 38 and 40 would be constructed of a metallic material to which the magnets 102 and 104 would be readily attracted and become firmly attached when placed thereagainst while, at the same time, being relatively easily slidable laterally for purposes of initially aligning the mold halves 42 and 44 by the above-described procedure of bringing about an interfitting relationship of their respective casting surfaces 78 and 80 as shown in FIG. 5.

It is also pointed out that in view of the fact that some shrinkage of the casting material might take place during polymerization thereof, the lower mold holding member 40, being axially slidably fitted in the bore 34 as described above, will be free at all times to lift in response to existing effects of shrinkage of the casting materials and thereby prevent the possible pulling away of the casting material from one or the other or both of the casting surfaces 78 or 80. Thus, distortionless finished surfaces on the resultant cast lenses will be assured. It should be understood, however, that in the casting of relatively small and thin articles such as corneal contact lenses, shrinkage of material is practically negligible.

As mentioned above, contact lenses may be required to have other than similarly shaped spherical curvatures upon their opposite sides, and may, for example, require a curvature on the posterior side which differs considerably from the curvature on its opposite side. In such a case, the mold halves bearing the curvatures required on their casting surfaces are first mounted for alignment with each other upon the holding members 38 and 40 of the device 26 in the manner described above with relation to FIGS. 2–6 or as shown in FIG. 8. However, since the casting surfaces of the mold halves would not embody curved shapes of the above-mentioned character, the previously described alignment thereof by interfitting of the casting surfaces as shown in FIG. 5 would have to be modified as shown in FIG. 9.

In this respect, where the upper mold half 42' (FIG. 9) is provided with a casting surface 78' having a substantially different shape than that of the casting surface 80' of the lower mold half 44', an intermediate aligning button 106 preferably formed of a material similar to that of the mold halves 42' and 44' is used. The button 106 is provided with a convex surface curvature 108 on one side matching that of the curvature 80' of the mold half 44' and a coaxial concave curvature 110 on its opposite side matching that of the curvature 78' of the mold half 42'. Following the attachment of the mold halves 42' and 44' to their respective holding members 38 and 40 in the manner described above, wherein at least one of said mold halves is readily adjustable laterally by sliding along the surface of its holding member, the button 106 is placed with its convexly curved surface 108 accurately interfitted with the surface 80' of the mold half 44'. The holding member 38 is then lowered to cause the casting surface 78' of the mold half 42' to enter into the concavity formed by the surface 110 of the button 106. In so doing, the effect of the identically curved surfaces 110 and 78' tending to become interfitted will cause the mold half 42' to slide laterally along the surface of the holding member 38 to the point where accurate coaxial alignment of the mold halves 42' and 44' will result.

Following this alignment procedure, the mold half 42' is retracted from the concavity in the button 106 and the button is removed. The mold half 42' is then lowered by operation of the thumb nut 60 on the device 26 to the point where a desired spacing between the casting surfaces 78' and 80' is arrived at and indicated by the pointer 68 and markings 64 (see FIGS. 2 and 3). This condition is illustrated in FIG. 10 and, as also shown in FIG. 10, casting material 112 of a preselected type is inserted between the casting surfaces 78' and 80' to form the resultant lens having a posterior surface shape matching that of the casting surface 78' and an anterior surface having a shape matching that of the casting surface 80'.

For lenses which are to be formed with one or more toric surfaces, the procedure shown and described with relation to FIGS. 9 and 10 would be followed. In accomplishing an accurate interfitting of the matching surfaces of the mold halves and button 106, however, some rotation as well as lateral sliding of the slidably attached mold half might be required to align the cylinder meridians of the mating toric curves of the button and particular mold half interfitting therewith. The necessary rotation and sliding action of the adjustable mold half will take place automatically as the surfaces which are intended to interfit are forced together. If desired, however, some assistance to the aligning procedure may be given by sliding and/or rotating the adjustable mold half with the fingers without detaching the same from its holding member. A feel with the fingers will also assure a proper interfit of the adjoining surfaces.

It is pointed out that once the mold halves are properly aligned upon the device 26, the raising and lowering of the holding member 38, which is keyed against rotation, will not disturb the axial or meridianal relationship of mold halves having sphero-cylinder casting surfaces and repeated accurate duplication of lenses can be accomplished without further realignment of the molds.

From the foregoing, it can be seen that an improved, simplified and economical method has been provided for accomplishing all of the objects and advantages of the invention. However, it should be understood that many changes in the steps of the process may be made without departing from the spirit of the invention as expressed in the accompanying claims and the invention is not to be limited to the exact matters shown and described as only preferred matters have been given by way of illustration.

Having described my invention, I claim:

1. The method of aligning a pair of mold halves having interfittable curved casting surfaces in a casting device having a pair of mold supporting members at least one of which is movable toward the other comprising attaching said mold halves one to each of said supporting members in such manner as to permit at least one of said mold halves to slide laterally in a single plane relatively freely on its respective supporting member without becoming detached therefrom and with the respective casting surfaces of said mold halves directed toward each other, moving said supporting members one toward the other an amount sufficient to cause said curved casting surfaces to engage each other and continuing said movement until said curved surfaces become accurately interfitted by the action of at least one of said mold members sliding laterally relative to the other thereof in said single plane to automatically bring about an initial alignment of said surfaces.

2. The method of aligning a pair of mold halves having differently curved casting surfaces with at least one of said curved surfaces departing from a spherical shape in a casting device having a pair of mold supporting members at least one of which is movable toward the other comprising attaching said mold halves one to each of said supporting members in such manner as to permit at least one of said mold halves to slide laterally in a single plane relatively freely on its respective supporting member without becoming detached therefrom and with the respective casting surfaces of said mold halves directed toward each other, providing a relatively thin aligning member having a surface on a first side thereof which is accurately interfittable with the casting surface on a first of said mold halves and a coaxial surface on its second side which is accurately interfittable with the casting surface on the second of said mold halves, placing said aligning member on said first of said mold halves with the said first surface of said aligning member accurately interfitted with the casting surface of said first mold half, moving said supporting members one toward the other an amount sufficient to cause the casting surface of the second of said mold halves to engage said second surface of said aligning member and continuing said movement until said casting surface of said second mold half becomes accurately interfitted with said second surface of said aligning member by the action of at least one of said mold members sliding laterally in said single plane relative to the other thereof to bring about an initial alignment of said casting surfaces.

3. The method of casting a contact lens comprising providing a pair of mold halves each having a casting surface shaped in accordance with the ultimate shape desired of the opposite sides of said lens, attaching said mold halves with their respective casting surfaces facing each other on said supporting members in such manner as to permit one of said halves to be moved laterally in a single plane without becoming detached from said member, moving said mold halves and supporting members one toward the other to cause said casting surfaces thereof to become engaged with each other by an amount sufficient to cause said movable mold half to be automatically moved in said plane into coaxially aligned relation with the casting surfaces of the other mold half, moving said mold halves apart from each other a distance sufficient to provide a spacing between their respective casting surfaces substantially equal to the thickness desired of said lens, inserting an initially flowable resinous material between said casting surfaces and heating said inserted material to a predetermined temperature and for a controlled time period sufficient to substantially completely polymerize the same.

4. The method of casting a contact lens comprising providing a pair of mold halves each having a casting surface shaped in accordance with the ultimate shape desired of the opposite sides of said lens, attaching said mold halves to means for individually holding said mold halves with their respective casting surfaces directed toward each other and with said holding means for at least one of said mold halves being such as to permit relatively free lateral adjustment of its respective mold half in a single plane without it becoming disconnected therefrom, aligning said mold halves by moving said holding means one toward the other an amount sufficient to cause said casting surfaces to become engaged and, by said engagement, automatically causing said movable mold half to slide laterally in said single plane to move the casting surface thereof into alignment with the casting surface of said other mold half, moving said mold halves apart from each other a distance in accordance with the thickness desired of said lens, filling the resultant spacing between the casting surfaces of mold halves with an initially flowable resinous material and applying heat of a predetermined temperature and for a controlled time cycle sufficient to substantially completely polymerize said resinous material while in between said mold halves.

5. The method of coaxially aligning a spherically curved casting surface on one mold half and an oppositely spherically curved surface on another mold half in a casting device having separate supporting members for individually supporting and moving said mold halves one toward the other, said method comprising attaching said mold halves one to each of said supporting members with their respective curved surfaces facing each other and in such manner as to permit at least one of said mold halves to slide laterally relative to the other mold half on its supporting member without becoming detached therefrom, moving said supporting members and attached mold halves one toward the other to cause said casting surface of one mold half and said oppositely curved surface on the other mold half to enter one into the other and continuing said movement until a peripheral edge of a curved surface on one mold half is in continual engagement with the curved surface on the other mold half as the result of lateral sliding movement of one of said mold halves on its respective supporting member.

References Cited in the file of this patent

UNITED STATES PATENTS

| | | |
|---|---|---|
| 116,636 | Selden | July 4, 1871 |
| 2,177,461 | Ruthven | Oct. 24, 1939 |
| 2,248,464 | Richard | July 8, 1941 |
| 2,304,664 | Smith | Dec. 8, 1942 |
| 2,357,904 | Mulcrone | Sept. 12, 1944 |
| 2,672,664 | Sudziarski | Mar. 23, 1954 |
| 2,711,558 | Baker et al. | June 28, 1955 |
| 2,723,423 | Kyle | Nov. 15, 1955 |
| 2,728,106 | Herman et al. | Dec. 27, 1955 |
| 2,745,138 | Beattie | May 15, 1956 |
| 2,823,417 | Pasini | Feb. 18, 1958 |